United States Patent [19]
Giorgetti et al.

[11] Patent Number: 5,294,191
[45] Date of Patent: Mar. 15, 1994

[54] BRAKING SYSTEM FOR ELECTRICALLY DRIVEN VEHICLES

[75] Inventors: Alberto Giorgetti; Luigi Cavestro; Roberto Lavezzi, all of Curno, Italy

[73] Assignee: Brembo S.p.A., Curno, Italy

[21] Appl. No.: 919,365

[22] Filed: Jul. 23, 1992

[30] Foreign Application Priority Data

Aug. 2, 1991 [IT] Italy .................... BG91 A 000027

[51] Int. Cl.$^5$ ................................ B60T 8/00
[52] U.S. Cl. ........................ 303/3; 180/65.1; 180/165; 188/156; 303/15; 303/100; 303/113.1
[58] Field of Search .................. 303/3, 13, 14, 15, 93, 303/113.4, 100, 113.1, 22.1, DIG. 3, DIG. 4; 188/156, 162, 158, 159, 160, 161; 180/65.1–65.8, 165, 197, 246

[56] References Cited

U.S. PATENT DOCUMENTS

| | | | |
|---|---|---|---|
| 3,719,881 | 3/1973 | Shibata et al. | 180/65.4 X |
| 4,002,373 | 1/1977 | Mori | 303/15 X |
| 4,346,303 | 8/1982 | Bukatarevic | 180/65.4 X |
| 5,148,883 | 9/1992 | Tanaka et al. | 180/65.8 X |

Primary Examiner—Douglas C. Butler
Attorney, Agent, or Firm—Bucknam and Archer

[57] ABSTRACT

Braking system for electrically driven vehicles, equipped with electric motors on the four wheels, consisting of a combined electric-hydraulic system including at least one hydraulic circuit mated to at least one pressure transducer or sensor connected to control centers for the electric motors.

10 Claims, 2 Drawing Sheets

BRAKING SYSTEM FOR ELECTRICALLY DRIVEN VEHICLES

BACKGROUND OF THE INVENTION

1. Field of the Invention

This invention refers to a braking system for electrically driven vehicles.

More specifically, this invention refers to a braking system for vehicles equipped with electric motors on the four wheels.

2. Description of the Prior Art

According to current regulations, braking systems must be designed and sized in such a way as to guarantee that the rear axle of four-wheeled vehicles generally never locks or only locks after the front one has already locked, so as to avoid loss of control of lateral stability.

Thus the braking system must be able to guarantee that the rear axle never reaches the point of locking or, anyway, in the case of locking of one of the axles, it will be the front one that locks first.

Currently, to achieve this, the braking system must be sized in a different way on the two axles.

SUMMARY OF THE INVENTION

The object of this invention is that the provision of a braking system for electrically driven vehicles which satisfies the aforementioned requirements.

More specifically, the object of this invention is the provision of a braking system for four-wheeled vehicles, equipped with a front and rear axle and with electric motors on the four wheels, which does not allow the rear axle to lock.

A further object of this invention is the provision of a braking system for four-wheeled vehicles, equipped with a front and rear axle and with electric motors on the four wheels, which guarantees locking of the front axle before locking of the rear axle.

According to this invention, these and other objects are attained by means of a braking system for electrically driven vehicles motorized on the four wheels, consisting of a combined electric-hydraulic system.

Specifically, the braking system of this invention includes at least one hydraulic circuit for the brakes coupled to at least one pressure or power transducer, or similar, which, depending on the fluid pressure generated by the control pedal, sends a proportional signal to the electric motors' control, centres.

These centres operate on the closing of bypass valves located in the hydraulic circuit, while the electric motors start to work as a brake, outputting torques proportional to the pressure transducer signal, which modulate the required braking deceleration.

Maximum motor performance is reached as braking increases. A further increase in braking, again by using the pedal, causes an increase in pressure which progressively opens some delay valves present in the hydraulic circuit and the action of the hydraulic brake is added to the action of the electric brake.

For speeds below the conditions of absence of torque on the electric motors, braking is guaranteed in any case by the hydraulic breaking circuit.

Several modifications are possible, such as, for example, the energy feedback from the electric motors can be equal on the two axles, with a solution of the traditional type with a sensor based on the load, and a solution with antilocking devices on the front axle.

In this case the energy recovery is differentiated on the two axles, according to a traditional solution, without a sensor based on the load and, according to another solution, by means of antilocking devices. The entire braking is controlled electronically, both that produced by only the electric motors and that produced by the motors and by the hydraulic brake.

In the braking system of this invention, the electric brake is the first device to intervene when the brake command is activated, exploiting the energy recovery and, in the electric braking phase, namely the recovery of energy, the batteries of the vehicle are recharged; the hydraulic brake only intervenes as an increment when the electric brake has reached its maximum performance. The hydraulic brake is always active if the speed of the vehicle is lower than that corresponding to the conditions of absence of torque in the electric motors, in particular and for example at speeds lower than 5 km/h since, in these conditions there is no energy recovery. Moreover, the hydraulic brake is fully applicable and functional in the case of lack of energy and/or breakdown of any electrical part.

The combined electric-hydraulic braking system of this invention has a substantially modulable operation, like that of normal vehicles.

The advantage gained by the, braking system of this invention essentially consist of the fact that it guarantees uniformity of operation and driving regularity corresponding to that of traditional systems. During the electric braking action, namely during the recovery of energy, the batteries are subject to recharging, with the result of considerably increasing the range of the vehicle and reducing the operating costs. Moreover, the combined braking system of this invention guarantees progressive, regular action in any running condition of the vehicles.

BRIEF DESCRIPTION OF THE DRAWINGS

The constructional and operating features of the braking system of this invention can be better understood by the description which follows in which reference is made to the figures of the appended drawings which represent forms of embodiment of this invention, given only with the object of providing examples and not limitations, and in which.

DESCRIPTION OF THE PREFERRED EMBODIMENTS

Figure 1:
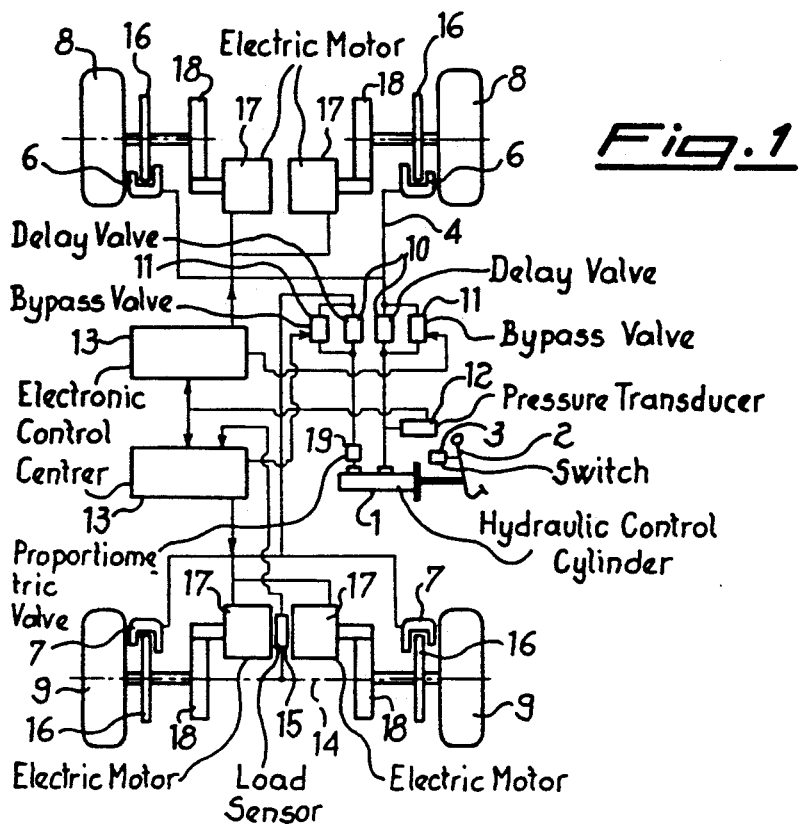
FIG. 1 shows the layout of a braking system with energy recovery from the electric motors equal on the two axles and with a traditional hydraulic group, combined with a load function sensor.

The figures illustrate the layout of a vehicle including a front axle and a rear one (14), two front wheels (8) and two rear wheels (9), an electric motor (17) on each wheel (8,9), disc or drum brakes (16) with pads or shoes (6,7) located on the axles in correspondence with each wheel and the braking system of this invention.

The braking system of this invention includes a hydraulic control cylinder (1), activated by a pedal (2) with a switch for lighting the stop-lights (3) and two distinct hydraulic circuits (4) and (5) derived from said cylinder (1) and connecting said cylinder to the brake pads (6) and (7) of the front (8) and rear (9) wheels respectively.

Each hydraulic circuit (4) and (5) is provided with a delay valve (10) coupled to an electric bypass valve (11). A pressure transducer (12), or any force sensor, is located on one of the hydraulic circuits (4) or (5) close to the hydraulic cylinder (1), and is connected to electronic control centres (13). The transducer or force sensor (12) detects the pressure corresponding to the force applied to the brake pedal (2). A sensor (15) is located on the rear axle (14) for detecting the load and a proportiometric valve (19) is preferably located on the rear hydraulic circuit (5), on exit from the hydraulic cylinder (1).

Operating the brake pedal (2) displaces the amount of fluid needed to move the brake pads or shoes (6) and (7) and approach them to the corresponding discs or drums (16). The pressure does not increase during this movement of the brakes; at the end of same pressure starts to be created in the hydraulic circuits (4,5) and the transducer (12) sends its signal, proportional to the pressure, to the control centres (13) of the motors (17), coupled to the front (8) and rear (9) wheels through reduction gears (18).

The control centres (13) output a signal for closing the bypass valves (11); while the pressure exerted by the action of the pedal (2) is intercepted by the delay valves (10). At the same time the control centres (13) start up the electric motors (17) as brakes, causing them to output an opposite torque to the driving one, proportional to the signal output by the pressure transducer (12). In this way the required deceleration is obtained with modulation. Increasing the action on the pedal (2), maximum braking performance of the electric motors (17) is obtained. A further increase of action on the pedal (2) leads to a pressure increase which proportionally opens the delay valves (10) and the action of the hydraulic brake is added to the braking action of the electric motors (17).

When braking is finished, namely below a minimum speed, for example of about 5 km/h corresponding to the speed below which the electric motors do not provide torque, the control centres (13) of the motors (17) deactivate the bypasses (11), allowing the full hydraulic pressure to be applied. In this way the hydraulic pressure exercised by the pedal (2) on the piston (1) is applied in full, as a replacement for the inactive electric brake.

When the pedal (2) is released, the control centres (13) of the motors switch off, in preparation for the next intervention. The load sensor (15) has the function, and is calibrated accordingly, of regulating the braking, or energy recovery, torque depending on the load condition and acts between the conditions of full load and no load respectively. The regulation performed by the sensor (15) between the conditions of maximum and minimum load is set on the basis of the ideal theoretical braking characteristics and therefore is always active, no matter what the load and adhesion conditions might be at the time.

In conditions when the vehicle is unloaded, the sensor can reduce the performance that the rear motors can give by up to 50%. This means that, in any case, for any load and adhesion condition, the sensor (15) regulates the braking action in such a way that possible locking of the axles will occur first on the front one and then on the rear one, to avoid loss of control of the vehicle's lateral stability. In addition to the load sensor (15), a proportiometric valve (19) is provided on the hydraulic circuit (5) relative to the rear brakes which modulates the passage of the brake fluid in such a way as to cause a difference by reduction in the pressure on its circuit compared to that present in the hydraulic circuit (4), relative to the front wheels (8). In cases of emergency with abrupt, unexpected braking, it cannot be excluded that locking of one or both axles could occur, as happens with any motor car which is not fitted with an antilocking device.

Figure 2:
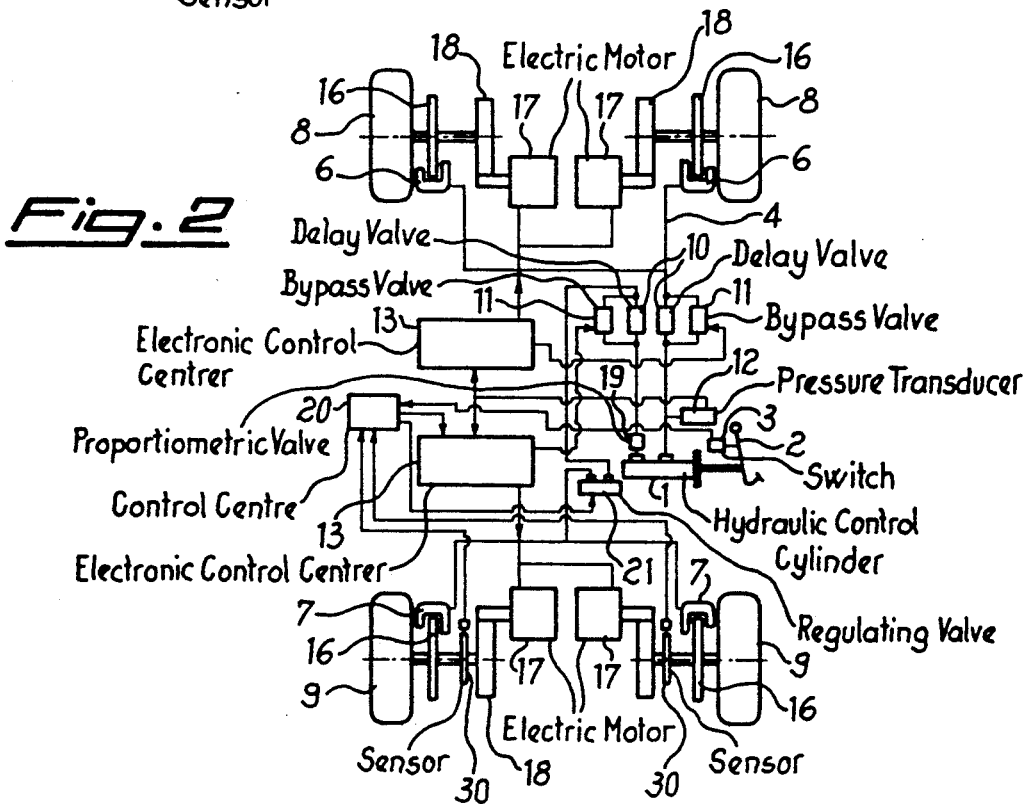
FIG. 2 shows the layout of a braking system similar to the one illustrated in FIG. 1, but also fitted with an antilocking device.

FIG. 2 illustrates a braking system with equal electric motors (17) on two axles coupled to an antilocking system. This solution contemplates the elimination of the load sensor (15) and the application of an antilocking system consisting of a control centre (20), which regulates a valve (21), and sensors with phonic wheels (30) fitted to the rear axles. This is located on the rear hydraulic circuit (5) and is activated by an electric signal received, for example, from the stop-lights switch (3). The action of the antilocking generally occurs on two occasions: during panic braking, avoiding locking of the rear axle, and during normal braking, regulating the breaking action of the rear axle, in substitution of the load function sensor (15).

The antilocking system acts as a governor depending on the deceleration required, the load and the adhesion available.

For deceleration less than the deceleration limit of the electric motors, the device does not intervene in the case of good adhesion. In conditions of poor adhesion, however, it removes the excess amount of torque from the rear motors. For medium deceleration, the device does not intervene in the case of good adhesion and in the case of full load, while it intervenes in conditions of low adhesion with the vehicle unloaded, removing both the pressure applied and part of the motor torque.

Figure 3:
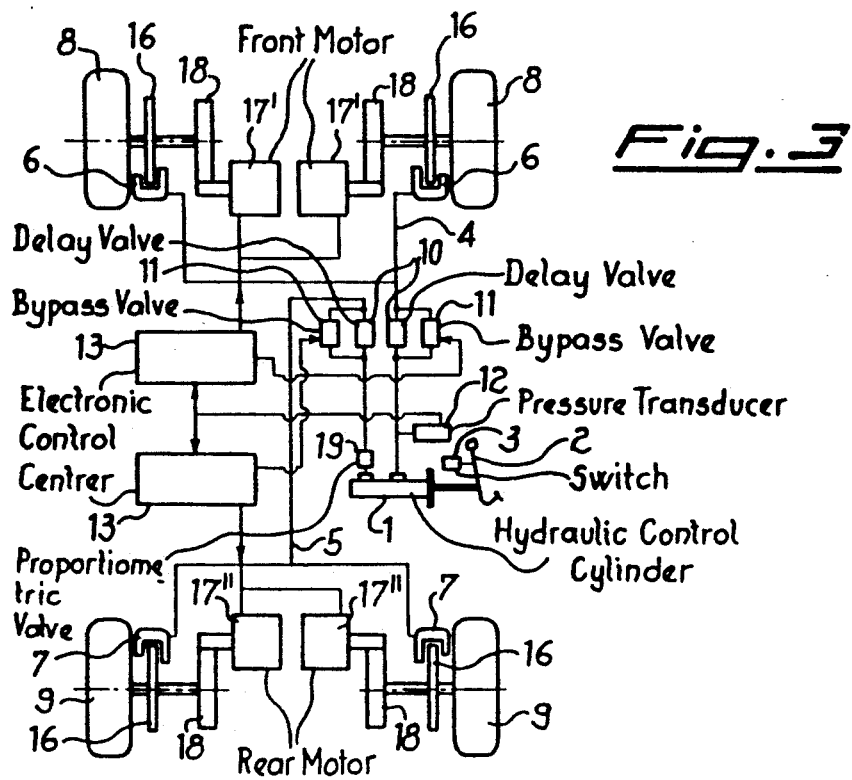
FIG. 3 shows the layout of a braking system similar to the one illustrated in FIG. 1, but with differentiated recovery on the two axles and with a traditional hydraulic group, without the load function sensor.

For heavy deceleration, the device does not intervene under full load since the conditions are basically ideal, while it intervenes with the vehicle unloaded removing only the pressure, while it does not remove the motor torque. In this case there is basically no adhesion involved since it is obvious that heavy deceleration cannot be obtained with low adhesion. During panic braking the,, antilocking device intervenes if the rear axle is brought to the point of locking, and its action is as follows: the valve (21) intercepts the sending of pressure to the rear axle and reduces that existing, up to fully discharging it if necessary; if the wheels do not lock it commands the reduction of the action of the electric motors (17). When the wheels start to turn normally again, it commands the modulated restoration of the hydraulic pressure; it repeats the cycle until the possible level of braking action is found in the braking conditions. FIG. 3 illustrates a further embodiment of the braking system of this invention.

According to this embodiment, the braking system is basically the same as that illustrated in FIG. 1, apart from the fact that the electric motors are differentiated in the energy recovery function. Specifically and as an example: the front motors (17') are sized for an energy recovery of 65%, while the rear motors (17") are sized for an energy recovery of 35%. In this case, too, the load sensor (15) is not necessary while the delay valves (10) are calibrated differently.

This solution maintains the axle locking sequence for any load and adhesion conditions.

It is obvious, however, that the danger of locking the axles during panic breaking remains. Since there is no regulation of the motors during the recovery phase under any load conditions, these always give the maximum possible performance for deceleration as a function of the braking.

According to a further embodiment of of the braking system of this invention, use of electronic control is contemplated for all the braking, both that produced by only the electric motors and that produced by the hydraulic brake, with the application of an antilocking device on each axle. The device is activated to set itself up for checking locking of the wheels (9) of the rear axle when the brake pedal (2) is activated, picking up an electrical signal from, for example, the stop-light switch (3) and transmitting it to the antilocking system's control centre (20) which activates the regulating valve (21). Operating is basically the same as that described for the braking system in FIG. 2.

Figure 4:
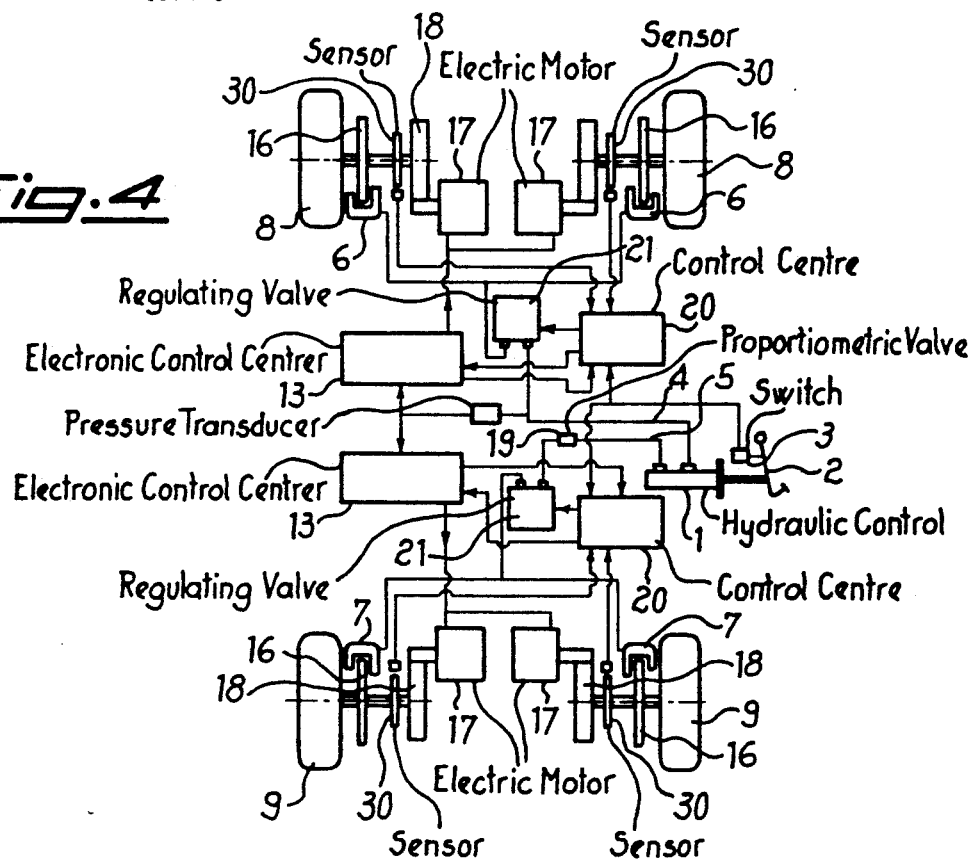
FIG. 4 shows the layout of a braking system fitted with antilocking devices on the two axles and totally electrically regulated.

FIG. 4 illustrates a further variation of the braking system of this invention. This embodiment is basically the same as that illustrated in FIG. 2 with the addition of an antilocking device on the front axle too.

As in the previous conditions for speeds less than those at which the electric motors can provide torque, 5 km/h for example, only the hydraulic brake is applied.

For higher speeds activating brake pedal (2) provides simultaneous activation of the stop-light switch (3) and the brake's hydraulic cylinder (1).

The electrical signal derived from the stop-light switch (3) immediately activates the control centres (20) for the antilocking systems which, in their turn, close the corresponding regulating valves (21) intercepting the pressure created by the cylinder (1) under the action of the pedal (2). At the same time the pressure which is created is detected by the pressure transducer (12) which sends its signal, proportional to the pressure, to the control centres (13) for the motors (17). The centres (13) start the motors (17) operating as brakes, making them output a torque proportional to the signal from the pressure transducer (12), thus allowing the required modulated deceleration to be obtained. An increase of action on the pedal (2) leads to the maximum braking performance of the electric motors; with a further increase, the control centres (13) for the motors (17) send the antilocking systems' centres (20) a signal proportional to the difference between the signal output by the transducer (12) and the threshold of maximum performance of the electric motors.

Using this signal, the centres (20) modulate the opening of the regulating valves (21) adding the regulated action of the hydraulic brake to the one already applied by the electric brake, to attain the required level of braking. At the end of braking, when the speed falls below the minimum output value of the electric motors, the centres (20) command the total opening of the valves (21), allowing total application of hydraulic braking.

When the pedal (2) is released, both the antilocking system control centres (20) and the motor (17) control centres are deactivated.

Apart from the various solutions described and illustrated, the hydraulic braking system is, in any case, operational at all times, even in the case of possible faults in the electric and/or electronic intervention and/or control devices.

During normal operating the electric braking by energy recovery, as described and illustrated, also contemplates the possibility of recharging the batteries, favouring a marked and advantageous increase in the range of the vehicle at virtually zero cost.

Even if, in the drawings of the various solutions, reference has always been made to disc brakes (16) with pads (6) and (7), it is obvious that the same braking systems can be validly used for operating other types of brake, such as drums and/or similar.

We claim:

1. In an electrically driven vehicle equipped with a front and a rear axle (14), two front wheels (8), two rear wheels (9), an electric motor (17) on each wheel (8,9), a combined electric-hydraulic brake system for regulating a braking action which comprises: disc brakes (16) located on said front and rear axles, corresponding to each of said front and rear wheels, pads (6,7) located on each of said disc brakes, a hydraulic control cylinder (1), having a pedal (2) for activating said control cylinder, said pedal having a switch (3) for lighting stop lights; said hydraulic control cylinder (1) forming a hydraulical front brake circuit (4) and a rear brake circuit (5), each of said circuits (4) and (5) connecting said control cylinder (1) to said pads (6,7); a delay valve (10) located on each of said hydraulic circuits (4,5), said control cylinder (1) exerting pressure through said pedal (2) on side delay valve (10), an electric bypass valve (11) located on each of said hydraulic circuits (4,5), said electric bypass valve being connected to said delay valve (10), electronic control units (13) connected to said electric motors and operating said electric motors units, said electronic control units actuating said electric bypass valves (11), a pressure sensor (12) connected to said hydraulic control cylinder (1) for detecting the pressure applied to said pedal (2) and signaling said electronic control units (13) in proportion to the pressure sensed to control the electric motors (17) to act as brakes on said wheels (8,9), a proportioning valve (19) located on said rear hydraulic circuit (5), said proportioning valve reducing the pressure to said rear circuit (5) whereby said pressure on the rear hydraulic circuit (5) differs from the pressure applied to said front hydraulic circuit (4).

2. The combined electric hydraulic brake system according to claim 1, wherein said vehicle has a load sensor (15) located on said rear axle (14) for detecting a load in said vehicle and for regulating the braking action of the electric motors (17) of the rear wheels (9) as a function of said load.

3. The braking system according to claim 2 which additionally includes a load sensor (15) located on the rear axle (14) and wherein at least one of the electric and hydraulic braking actions is divided between said two axles in a differentiated fashion, with the front one having higher percentages than the rear one; said differentiation being regulated by means of said load sensor (15).

4. The braking system of claim 3 wherein said differentiation is regulated by means of the differentiation of the energy function between said motors (17) of the front axle, in a greater proportion, and the motors of the rear axle, in a lesser proportion.

5. The combined electric hydraulic brake system as claimed in claim 1, wherein an antilocking system is located on said rear hydraulic circuit (5), said antilocking system comprising a control unit (20) activated by an electric signal originated from said stop lights switch (3), a hydraulic unit (21), said hydraulic unit being operated by said control unit (20) and being capable to regulate the pressure on said rear axle (14) and the action of said electric motors (17), and a speed sensor (30) arranged on said rear axle (14) and connected to said control unit (20).

6. The braking system according to claim 5 wherein a second antilocking system is provided on the front axle.

7. The braking system according to claim 1 wherein said hydraulic braking system is active under the action of said pedal (2) and said control cylinder (1), when said bypass valves (11) are open and said electronic control systems (13) are deactivated at least in the initial or final braking conditions corresponding to the speeds lower than or equal to the conditions when the electric motors (17) do not produce double braking.

8. The braking system according to claim 1 wherein said pressure sensor (12) gives a signal, said electric motors produce a torque proportional to said signal, said delay valves open and the initial braking action is produced by the energy derived from said torque produced by said electric motors (17) until their maximum performance is reached; to an increase in pressure on the control pedal (2), and on the hydraulic circuits (4) and (5), corresponding to the proportional opening of the delay valves (10) with a hydraulic braking action which is merged with the braking action produced by said electric motors.

9. The braking system according to claim 1 wherein said proportioning valve (19) located in said rear hydraulic circuit (5) modulates corresponding to a reduction of pressure on said rear disc brakes (16) in comparison with the pressure present in the front circuit (4).

10. The braking system according to claim 1 wherein said vehicle has batteries, energy is recovered during the braking action and said batteries are recharged during the braking action due to said energy being recovered.

* * * * *